United States Patent [19]
Rose et al.

[11] 3,909,244
[45] Sept. 30, 1975

[54] PROCESS FOR DIRECTLY REDUCING IRON ORES IN THE SOLID STATE UNDER PRESSURE

[75] Inventors: Fritz Rose, Ober-Erlenbach; Horst Bechthold, Frankfurt am Main; Paul Bieniok, Bischofsheim; Dieter Stein, Wiesbaden, all of Germany

[73] Assignee: Metallgesellschaft Aktiengesellschaft, Frankfurt am Main, Germany

[22] Filed: June 11, 1974

[21] Appl. No.: 478,430

Related U.S. Application Data

[63] Continuation of Ser. No. 219,091, Jan. 19, 1972, abandoned.

[30] Foreign Application Priority Data
Jan. 27, 1971  Germany............................ 2103731

[52] U.S. Cl. .................................................. 75/35
[51] Int. Cl.² ......................................... C21B 13/02
[58] Field of Search ................ 75/34, 35, 26, 42, 91

[56] References Cited
UNITED STATES PATENTS

| | | | |
|---|---|---|---|
| 2,609,288 | 9/1952 | Stuart | 75/34 |
| 2,862,808 | 12/1958 | De Jahn | 75/34 |
| 2,865,732 | 12/1958 | Jensen | 75/34 |

*Primary Examiner*—L. Dewayne Rutledge
*Assistant Examiner*—M. J. Andrews
*Attorney, Agent, or Firm*—Burgess, Dinklage & Sprung

[57] ABSTRACT

Lumpy or agglomerated materials containing iron oxide are reduced in shaft furnaces by treating such materials with hydrogen-containing reducing gases under elevated pressure. The reduction is carried out in the final reducing zone under a pressure of from 3 to 30 atmospheres and at a temperature of from 600° to 1,000° C, using a reducing gas containing hydrogen and impurities consisting of, at most, 5 percent by volume carbon monoxide, 5 percent by volume carbon dioxide, 5 percent by volume methane, and 2 percent by volume steam.

9 Claims, 1 Drawing Figure

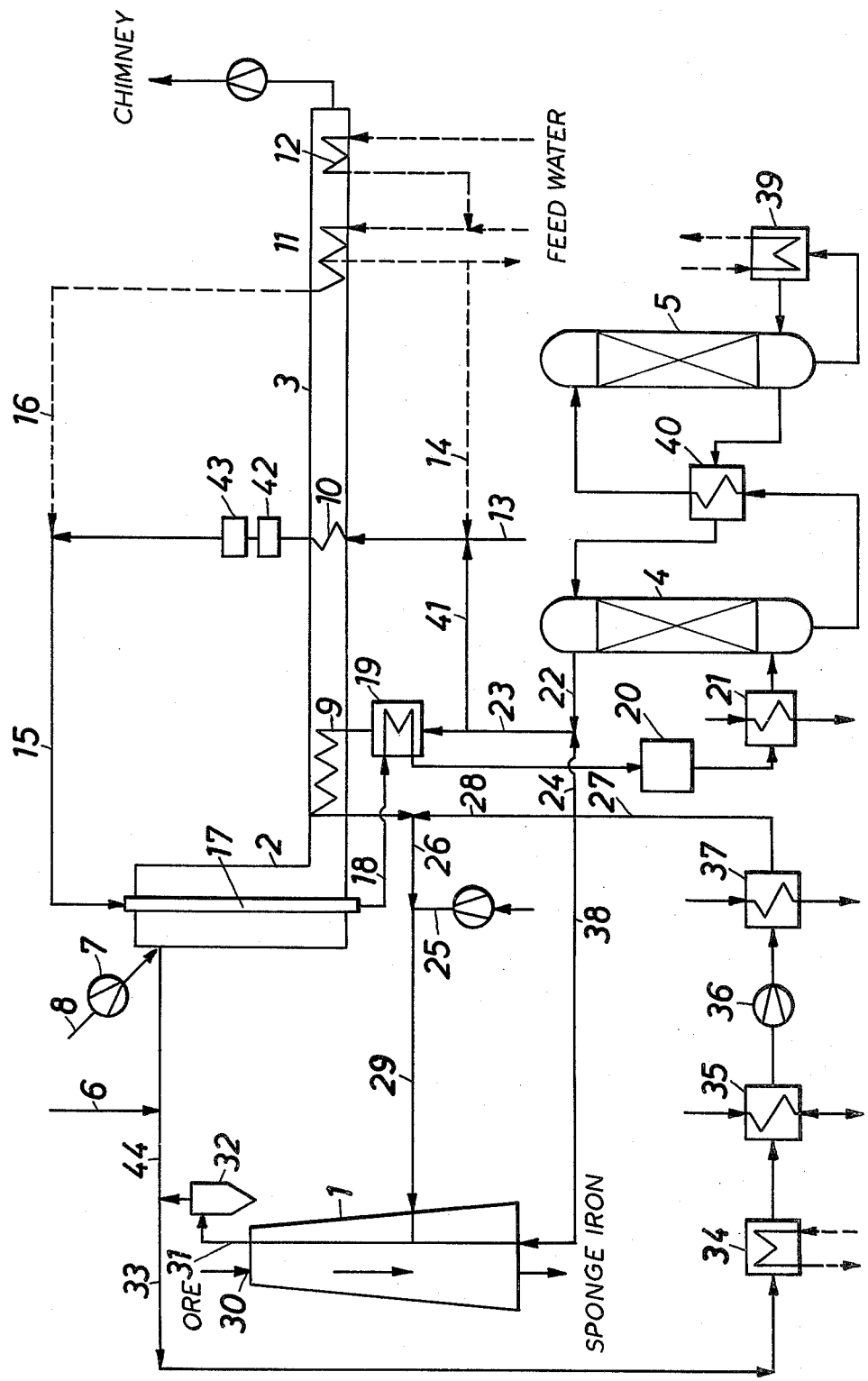

PROCESS FOR DIRECTLY REDUCING IRON ORES IN THE SOLID STATE UNDER PRESSURE

This is a continuation of application Ser. No. 219,091, filed Jan. 19, 1972, now abandoned.

BACKGROUND

This invention relates to a process for directly reducing lumpy or agglomerated materials which contain iron oxide in shaft furnaces by treatment with hydrogen-containing reducing gases under elevated pressure.

The term "direct reduction" relates to the reduction of iron ores in the solid state to sponge iron.

It is known to reduce lumpy or agglomerated iron ores in shaft furnaces under normal pressure conditions by treatment with reducing gases which consist of carbon monoxide and hydrogen. The reducing gases are produced by cracking hydrocarbons with steam or oxygen in cracking furnaces and are supplied the shaft furnaces from below (German Pat. No. 1,201,377).

Processes are also known in which iron ores are reduced in shaft furnaces by treatment with reducing gases produced by gasification of solid or liquid carbonaceous materials. The reducing process is carried out under elevated pressure (Opened German Application 1,911,052; Opened German Application 1,925,662; Opened German Application 1,926,269).

The disadvantages of these processes reside in the fact that reducing gases produced from solid or liquid carbonaceous materials contain impurities, such as tar, ash, soot, and possibly sulphur, which are deleterious or disturbing in the process and must be removed at high expense.

In all processes for the reduction of iron ores in shaft furnaces, the reduction is effected by treatment with gas mixtures consisting of CO and $H_2$ because it was believed that reduction with gases containing hydrogen results in a higher rate of reduction than where pure CO gas is used and that the highest rate of reduction is achieved with a reducing gas which consists of about 50 percent by volume $H_2$ and about 50 percent by volume CO.

In all known processes of directly reducing iron ores in shaft furnaces, the exhaust gases or top gases emerging from the reducing shaft are reused for the reduction because the gases cannot be completely utilized in the reduction process owing to the chemical equilibrium which is adjusted.

If the reducing gases contain CO and $H_2$, the reduction results in $CO_2$ and $H_2O$ as oxidation products. The removal of substantial amounts of these two different gas constituents from the reducing gas is more expensive than the removal of only one of these gas constituents.

The use of hydrogen alone as a reducing gas is known only from fluidization processes, in which fine-grained iron ores having a particle size between 0.1 and 3 millimeters are held in suspension and reduced by the gas stream.

This process has the disadvantage that the reduction must be carried out at relatively low temperatures, in order to avoid a caking on the walls of the reactor and an agglomeration between the individual ore particles. Such agglomeration would cause the fluidized bed to collapse. In this temperature range, a sufficiently high rate of reduction can be produced only when hydrogen is used as a reducing gas.

The use of hydrogen as a reducing gas under elevated pressure is also known in fluidization processes (U.S. Pat. No. 2,900,246). Because only about 5 percent of the hydrogen is reacted at relatively low reduction temperatures, a plurality of process steps are required in spite of the elevated pressure.

SUMMARY

It is an object of the invention to increase the rate of reduction of lumpy or agglomerated materials and to increase the economy of the regeneration of the recirculating gases.

This object is accomplished according to the invention in that the reduction is carried out under a pressure of 3–30 atm, and at a temperature of 600°–1000° C. in the final reduction zone, with a reducing gas consisting of hydrogen and impurities which consist of, at most, 5 percent by volume CO, 5 percent by volume $CO_2$, 5 percent by volume $CH_4$ and 2 percent by volume steam.

DESCRIPTION OF THE DRAWING

The accompanying drawing is a schematic flow diagram of apparatus suitable for carrying out the process of the inventions.

DESCRIPTION

The total of CO, $CO_2$, $CH_4$ and hydrogen in the reducing gas is preferably below 12 percent by volume.

In a preferred development of the process, the pressure in the shaft furnace is 5–15 atm.

In another preferred development, the temperature in the final reduction zone is 700°–900° C.

In another development of the process, the reducing gas is produced in that hydrocarbons are cracked in a cracking furnace in contact with a catalyst and at a temperature of 700°–1100° C. and under pressures of 3–30 atm in the presence of steam, and the cracked gas having left the cracking furnace is subjected to a conversion of CO and a removal of $CO_2$ and $H_2O$ and before entering the shaft furnace is mixed with a partial stream of the purified exhaust gas from the reduction.

The reducing gas is preferably produced from hydrocarbons having 1–10 carbon atoms.

In another embodiment of the process, the reducing gas is heated to the reduction temperature by a partial combustion before it enters the shaft furnace and after oxygen or oxygen-containing gases have been admixed.

In a further development of the invention, hot reducing gas is supplied to the shaft furnace on a medium level and cold reducing gas is introduced at the bottom of the furnace as a cooling gas for the reduced iron.

In another development of the process, a partial stream of the unpurified exhaust gas from the reduction is used as a fuel in the process by being afterburnt. In this way, an enriching of undesired gas constituents in the process can be avoided and the heat content of the removed gases may be utilized.

In a development of the invention, 3–10 percent by weight of nonreactive material are added to the materials which contain iron oxide, in order to prevent an agglomeration in the shaft furnace.

In a preferred embodiment, that partial stream of the exhaust gas from the reduction which is to be purified is cooled by means of air coolers.

The advantages afforded by the invention reside particularly in that the rate of the reduction by a treatment with hydrogen as a reducing gas is increased under the conditions according to the invention.

It has generally been found surprisingly that increasing rates of reduction are obtained as the $H_2$ content in mixed gases consisting of CO and $H_2$ increases and the highest rate of reduction is obtained with pure hydrogen.

Besides, the recycle gases can be regenerated more economically because the reducing gas consists mainly of hydrogen so that it is sufficient to cool the exhaust gas for regeneration to condense the water, or a small partial stream of this exhaust gas is branched off when a certain $CO_2$ content in the reducing gas is reached, or the small $CO_2$ content is lowered or removed.

The process according to the invention will be illustrated in detail with reference to the following examples:

EXAMPLE 1

150 Standard cubic meters of natural gas are cracked in a cracking furnace with steam at 10 atm and 900° C. 638 standard cubic meters of gases of composition A (Table 1) leave the cracking furnace at about 875° C. and are reacted in the converting reactor by a water gas reaction to produce 731 standard cubic meters of gas of composition B (Table 1). The removal of $CO_2$ in the gas-purifying plant leaves 595 standard cubic meters of gas of composition C (Table 1).

In the same gas-purifying plant, the $CO_2$ is scrubbed from 532 standard cubic meters of the recycle gas of composition (Table 1) to leave 520 standard cubic meters of gas of composition G (Table 1).

The gases which leave the gas-purifying plant are mixed with 1025 standard cubic meters of untreated recycle gases of composition F. The mixed gases amounting to 2140 standard cubic meters are heated to 850° C. and enter the reducing shaft furnace on a medium level. 460 Standard cubic meters of recycle gas of composition F are supplied at the bottom of the furnace to cool the sponge iron and together with the mixed gases constitute 2600 standard cubic meters of reducing gas of composition D (Table 1), by which 1.43 metric tons hematite iron ore are reduced to 1.0 metric ton sponge iron with a metallization of about 95 percent. The exhaust gases of composition E (Table 1) emerge from the reducing shaft furnace and are cooled to condense the water.

The exhaust gas which has thus been purified consists of 2020 standard cubic meters recycle gas of composition F.

EXAMPLE 2

136 Kilograms hydrocarbons having preferably 4–6 carbon atoms are cracked with steam in a cracking furnace at 20 atm end 800° C. 1490 standard cubic meters of gases of composition A (Table 2) leave the cracking furnace at 775° C. and in the converting reactor are reacted by the water gas reaction to produce 1650 standard cubic meters of gas of composition B (Table 2). When the $CO_2$ has been removed in the gas-purifying plant, 1351 standard cubic meters of gas of composition C (Table 2) are left.

The gases leaving the gas-purifying plant are mixed with 806 standard cubic meters recycle gas of composition F (Table 2) and are indirectly heated. A partial combustion with oxygen increases the temperature in the gas mixture to 750° C.

At this temperature, the mixed gases enter the reducing shaft furnace on a medium level. 460 Standard cubic meters of recycle gas of composition F are supplied at the bottom of the furnace and together with the mixed gases constitute 2617 standard cubic meters of reducing gas of composition D (Table 2). This gas is used to reduce 1.43 metric tons of hematite iron ore to sponge iron.

947 Standard cubic meters of the 2580 standard cubic meters of exhaust gases of composition E (Table 2) which leave the reducing shaft furnace are used to heat the cracking furnace and the remaining 1633 standard cubic meters are recycled. When 367 standard cubic meters of steam have been condensed, 1266 standard cubic meters of recycle gas of composition F are left and are used for cooling or in a mixture with gas of composition C are recycled to the reducing shaft furnace.

Table 1

| % by volume | A | B | C | D | E | F | G |
|---|---|---|---|---|---|---|---|
| $CO_2$ | 7.7 | 19.5 | 1.00 | 1.9 | 2.7 | 2.7 | 1.0 |
| CO | 15.3 | 0.5 | 0.6 | 4.1 | 5.2 | 5.2 | 5.3 |
| $H_2$ | 76.6 | 79.6 | 98.0 | 90.0 | 86.9 | 86.9 | 88.5 |
| $CH_4$ | 0.4 | 0.4 | 0.4 | 4.0 | 5.2 | 5.2 | 5.2 |
| $H_2O$ | 51.2 | 31.7 | 0.4 | 0.4 | 29.2 | 0.4 | 0.4 |

Table 2

| % by volume | A | B | C | D | E | F |
|---|---|---|---|---|---|---|
| $CO_2$ | 10.0 | 18.7 | 0.5 | 1.5 | 2.1 | 2.1 |
| CO | 10.9 | 0.2 | 0.3 | 4.0 | 5.2 | 5.2 |
| $H_2$ | 72.9 | 75.5 | 92.4 | 89.5 | 87.5 | 87.5 |
| $CH_4$ | 6.2 | 5.6 | 6.8 | 5.0 | 5.2 | 5.2 |
| $H_2O$ | 63.94 | 48.1 | 0.2 | 0.2 | 29.3 | 0.2 |

An embodiment of the invention is illustrated in the drawing.

A plant for carrying out the process is shown to include a reducing shaft furnace 1, a cracking furnace 2, a heat exchange system 3, in which the heat of the flue gases is utilized, and a gas-purifying plant which comprises an absorption tower 4 and a regenerating tower 5. To heat the cracking furnace 2, a fuel supplied in conduit 6 is burnt in the combustion chamber with air, which is supplied by a compressor 7 in conduit 8.

The flue gas is discharged to the chimney through the heat exchange system 3 and delivers its sensible heat in heat exchangers 9, 10, 11, and 12 to the purified recycled reducing gas 9, to the hydrocarbons 10 to be cracked, and to feed water 11, 12. The combustion air required for heating the cracking furnace may also be preheated in this heat exchange system.

The hydrocarbons to be cracked have steam admixed thereto from conduit 14 and are then conducted in conduit 13 to the heat exchanger 10 and heated therein. They are then conducted in conduit 15, in which further steam may be added from conduit 16, to the catalyst-filled tubes 17 of the cracking furnace 2.

The cracked gases emerge from the cracking tubes 17 and flow through conduit 18 and heat exchanger 19 to the converting reactor 20, in which the CO content of the gas is reacted with surplus steam in contact with a catalyst in accordance with the water gas reaction $CO + H_2O \rightarrow CO_2 + H_2$. After being cooled further in a cooler, the $CO_2$ is removed by scrubbing in the absorption tower 4. The gas consisting mainly of hydrogen flows through conduits 22 and 23 to the heat exchanger 19 and then to the heat exchanger 9. The hydrogen gases in the conduit 22 may be mixed with purified exhaust gas from the reduction, which exhaust gas is supplied in conduit 24. An afterburning of the entire reducing gas to effect a temperature increase may be induced by an addition of oxygen or air through conduit 25 into conduit 26. A partial stream of the purified exhaust gas from the reduction may be admixed from conduit 27 through conduit 28 to control the temperature in conduit 26.

The hot reducing gas is then supplied in conduit 29 to the shaft furnace 1 on a medium level.

In the upper portion of the shaft furnace, the ore to be reduced is charged into the furnace from a charging platform 30, and the exhaust gas from the reduction is withdrawn through conduit 31. In a cyclone 32, dust is collected from this gas, which is then conducted in conduit 33 to a heat exchanger 34, cooler 35, boost blower 36 and cooler 37 and is admixed through conduits 27 and 24 to the cracked gases leaving the absorption tower 4 of the gas-purifying plant.

A partial stream of the gas from conduit 27 is conducted in conduit 38 to the discharge valve of the shaft furnace and in the lower portion of the latter serves as a coolant for reduced iron. The cooling gas flows in a countercurrent to the descending reduced iron and is heated thereby and mixed with the gas which enters the reducing shaft furnace 1 from conduit 29.

In the gas-purifying plant, an aqueous solution of alkaline reaction, such as an alkali carbonate solution, is recirculated through the absorption tower 4 and the regenerating tower 5. The $CO_2$-laden absorption solution is boiled in the boiler 39 for regeneration, cooled in the heat exchanger 40 and recycled to the absorption tower 4.

To desulfurize the hydrocarbons to be cracked, a partial stream of the purified hydrogen gas may be admixed to the hydrocarbons through conduit 41. The mixture is then passed over the catalyst 42 and in contact therewith the sulfur compounds are hydrogenated to form $H_2S$. The hydrogen sulfide is absorbed in contact with catalyst 43.

When dust has been collected in the cyclone 32 from the exhaust gas from the reduction, a partial stream of said gas may be branched off through conduit 44. With this partial stream, it is possible, e.g., to remove part of the nitrogen which has entered the reducing gas in the combustion air from conduit 25 so that a constant, low nitrogen level is maintained in the recycled reducing gas. This partial stream may be used to heat the cracking furnace 2.

What is claimed is:

1. Process for directly reducing lumpy or agglomerated materials consisting of iron oxide which consists of treating said materials with a hydrogen-containing reducing gas in a shaft furnace having an upper zone for receiving said materials to be reduced, a reducing zone below said upper zone on a medium level under a pressure of 3–30 atms. and a lower cooling zone below said reducing zone, carrying out the reducing in said reducing zone at a temperature of 600°–1000°C, said reducing gas consisting of hydrogen and impurities, the total of said impurities being less than 12 percent by volume, said impurities consisting of a maximum of 5 percent by volume carbon monoxide, a maximum of 5 percent by volume of carbon dioxide, a maximum of 5 percent by volume methane and a maximum of 2 percent by volume steam, said reducing gas being supplied hot to said reducing zone thereby solely supplying the necessary heat for the reduction process, and cold to the lower portion of the furnace as a cooling gas for the reduced iron.

2. Process of claim 1 wherein the pressure in the shaft furnace is 5–15 atms.

3. Process of claim 1 wherein the temperature in the reducing zone is 700°–900°C.

4. Process of claim 1 comprising producing the reducing gas by cracking hydrocarbons in a cracking furnace in contact with a catalyst at a temperature of 700°–1100°C and pressures of 3–30 atms. in the presence of steam, subjecting the cracked gas leaving the cracking furnace to a conversion of CO by the water gas-reaction and a removal of $CO_2$ and $H_2O$ and mixing the converted cracked gas before entering the shaft furnace with a partial stream of exhaust gas from the reduction after said partial stream has been purified.

5. Process of claim 4 wherein the reducing gas is produced from hydrocarbons containing 1–10 carbon atoms.

6. Process of claim 1 wherein the reducing gas is mixed with oxygen or oxygen containing gases and thereafter is heated to the reduction temperature by a partial combustion before it enters the shaft furnace.

7. Process of claim 4 wherein a partial stream of the unpurified exhaust gas from the reduction is used as a fuel in the cracking process by being after-burnt.

8. Process of claim 1 wherein 3–10 percent by weight of non-reactive material is added to the materials containing iron oxide to prevent agglomeration in the shaft furnace.

9. Process of claim 4 wherein the partial stream of the exhaust gas from the reduction is cooled by means of air coolers prior to being purified.

* * * * *